United States Patent
Özyilmaz et al.

(10) Patent No.: US 10,663,833 B2
(45) Date of Patent: May 26, 2020

(54) ELECTROCHROMIC DEVICE WITH GRAPHENE/FERROELECTRIC ELECTRODE

(71) Applicant: National University of Singapore, Singapore (SG)

(72) Inventors: Barbaros Özyilmaz, Singapore (SG); Eeshan Sandeep Kulkarni, Singapore (SG); Iñigo Martin Fernandez, Singapore (SG); Chee Tat Toh, Singapore (SG); Antonio Helio Castro Neto, Singapore (SG)

(73) Assignee: National University of Singapore, Singapore (SG)

( * ) Notice: Subject to any disclaimer, the term of this patent is extended or adjusted under 35 U.S.C. 154(b) by 379 days.

(21) Appl. No.: 15/031,543

(22) PCT Filed: Nov. 6, 2014

(86) PCT No.: PCT/SG2014/000522
§ 371 (c)(1),
(2) Date: Apr. 22, 2016

(87) PCT Pub. No.: WO2015/069188
PCT Pub. Date: May 14, 2015

(65) Prior Publication Data
US 2016/0259224 A1 Sep. 8, 2016

Related U.S. Application Data

(60) Provisional application No. 61/900,474, filed on Nov. 6, 2013.

(51) Int. Cl.
*G02F 1/155* (2006.01)
*G02F 1/1333* (2006.01)
(Continued)

(52) U.S. Cl.
CPC ............ *G02F 1/155* (2013.01); *G02F 1/1334* (2013.01); *G02F 1/13439* (2013.01); *G02F 1/133305* (2013.01); *G02F 1/172* (2013.01)

(58) Field of Classification Search
CPC ... G02F 1/155; G02F 1/133305; G02F 1/1334
(Continued)

(56) References Cited

U.S. PATENT DOCUMENTS 5,621,552 A * 4/1997 Coates ................. C09K 19/544
349/86
6,294,231 B1 * 9/2001 Kuwabara .......... C09K 19/0208
252/299.64

(Continued)

FOREIGN PATENT DOCUMENTS

WO WO 2012/164259 12/2012
WO WO 2013/141817 9/2013

OTHER PUBLICATIONS

Notification of the Transmittal of the International Search Report and Written Opinion for International Application No. PCT/SG2014/000522, "Flexible Electrochromic Films With Graphene/Ferroelectric Material", dated Jan. 30, 2015.
(Continued)

*Primary Examiner* — Lucy P Chien
(74) *Attorney, Agent, or Firm* — Hamilton, Brook, Smith & Reynolds, P.C.

(57) ABSTRACT

In accordance with a version of the invention, graphene with a ferroelectric material is used as the transparent electrode material in an electrochromic device. The use of curved and dynamically flexing substrates enables flexible and stretchable applications for electrochromic films. Furthermore, the nonreactive and impermeable nature of graphene increases the durability of the device through increased resistance to external impurities. In addition, the incorporation of ferroelectric materials allows the device to exhibit nonvolatile
(Continued)

usage; that is, devices can remain transparent with no external power source. Furthermore, devices may exhibit a charging effect, permitting recovery of energy stored in alignment of ferroelectric dipoles within the ferroelectric material.

19 Claims, 10 Drawing Sheets

(51) Int. Cl.
*G02F 1/1334* (2006.01)
*G02F 1/1343* (2006.01)
*G02F 1/17* (2019.01)

(58) Field of Classification Search
USPC .......................................................... 349/165
See application file for complete search history.

(56) References Cited

U.S. PATENT DOCUMENTS

| | | | | |
|---|---|---|---|---|
| 6,907,101 | B2* | 6/2005 | Hoffman | G01T 1/2002 250/370.09 |
| 7,586,665 | B1* | 9/2009 | Martin | G02F 1/15 359/265 |
| 2002/0063673 | A1 | 5/2002 | Kawai | |
| 2002/0084442 | A1* | 7/2002 | Yasuda | G02F 1/13725 252/299.01 |
| 2002/0140215 | A1* | 10/2002 | Breed | B60N 2/853 280/735 |
| 2002/0149720 | A1* | 10/2002 | Janssen | G02F 1/13394 349/113 |
| 2012/0081943 | A1* | 4/2012 | Schubert | G11C 11/22 365/145 |
| 2012/0118368 | A1 | 5/2012 | Huang et al. | |
| 2012/0319976 | A1* | 12/2012 | Ahn | G06F 3/045 345/173 |
| 2013/0240033 | A1 | 9/2013 | Jeon et al. | |
| 2015/0168747 | A1* | 6/2015 | Kadono | G02F 1/015 348/360 |

OTHER PUBLICATIONS

Challa, S., et al., "Thermal induced phase separation of E7/PMMA PDLC system", *Journal of Thermal Analysis,* 45: 1297-1312 (1994).
Akins, R., et al., "Effect of thickness on PDLC electro-optics", *Proc. SPIE, 1665, liquid Crystal Materials, Devices, and Applications,* 280 (Jun. 15, 1992); doi: 10.1117/12.60396.
Malik, M., et al., "Effect of Nematic Liquid Crystals on Optical Properties of Solven Induced Phase Separated PDLC Composite Films", *Indian Journal of Science and Technology,* 5(10): 3440-3452.
Notification Concerning Transmittal of International Preliminary Report on Patentability for International Application No. PCT/SG2014/000522, "Flexible Electrochromic Films With Graphene/Ferroelectric Material", dated May 19, 2016.

* cited by examiner

ELECTROCHROMIC DEVICE WITH GRAPHENE/FERROELECTRIC ELECTRODE

This application is the U.S. National Stage of International Application No. PCT/SG2014/000522, filed Nov. 6, 2014, which designates the U.S., published in English, and claims the benefit of U.S. Provisional Application No. 61/900,474, filed Nov. 6, 2013, The entire teachings of the above applications are incorporated herein by reference.

RELATED APPLICATION

This application claims the benefit of U.S. Provisional Application No. 61/900,474, filed on Nov. 6, 2013, the entire teachings of which application are incorporated herein by reference.

BACKGROUND OF THE INVENTION

Electrochromic panels are a class of films able to switch between opaque and transparent under the application of an electric field. Such panels are typically used in domestic and commercial buildings in order to reduce energy consumption due to their ability to lower heat load by dissipating solar irradiation in their 'OFF' state. Conversely, panels in their 'ON' state are able to transmit incoming solar irradiation for buildings in cooler climates, thereby reducing cooling load. Electrochromic panels available in the market rely on Indium Tin Oxide (ITO) on glass as a transparent electrode material, which places limits on the potential curvature and dynamic flexibility of panels, primarily requiring them to be flat for optimum performance. Furthermore, constant power is required to maintain the electric field for transparency.

SUMMARY OF THE INVENTION

In accordance with a version of the invention, graphene with a ferroelectric material is used as the transparent electrode material in an electrochromic device. The use of curved and dynamically flexing substrates enables flexible and stretchable applications for electrochromic films. Furthermore, the nonreactive and impermeable nature of graphene increases the durability of the device through increased resistance to external impurities. In addition, the incorporation of ferroelectric materials allows the device to exhibit nonvolatile usage; that is, devices can remain transparent with no external power source. Furthermore, devices may exhibit a charging effect, permitting recovery of energy stored in alignment of ferroelectric dipoles within the ferroelectric material.

In accordance with one version of the invention, there is provided an electrochromic device. The device comprises at least one electrode including graphene and at least one ferroelectric material; and an active layer.

In further, related versions, the at least one electrode may comprise two electrodes, each of the two electrodes including graphene and at least one ferroelectric material. The at least one electrode may comprise at least one ferroelectric material layer located between a first layer of graphene and a second layer of graphene. The at least one electrode may comprise two electrodes, a first electrode of the two electrodes including graphene and at least one ferroelectric material, and a second electrode of the two electrodes comprising only graphene. The active layer may comprise a liquid crystal material, such as 4-Cyano-4'-pentylbiphenyl. The active layer may comprise the liquid crystal material dispersed in a polymer, such as poly(methyl methacrylate), poly(vinyl alcohol) or poly(vinyl butyral). The active layer may comprise a suspending polymer material, and may include particles, such as dihydrocinchonidine bisulfite polyiodide particles, in a suspending fluid, such as an oligomeric ester of methacrylic acid. The ferroelectric material may comprise a ferroelectric polymer, such as a fluoropolymer ferroelectric material or co-fluoropolymer ferroelectric material, for example polyvinylidene fluoride or polyvinylidene fluoride co-trifluoroethylene. The ferroelectric material may comprise an inorganic material, such as lead zirconate titanate.

In further, related versions, the electrochromic device may comprise a nonvolatile electric field across the active layer such that the electrochromic device is configured to remain transparent with no external power source. The electrochromic device may be configured to permit recovery of energy stored in alignment of ferroelectric dipoles within the ferroelectric material. The graphene of the at least one electrode may comprise monolayer graphene, bi-layer graphene, multilayer graphene, an interconnected graphene-based mesh network or a graphene composite. The electrochromic device may further comprise a substrate, which may be a flexible substrate, such as polyethylene terephthalate or polyvinylidene fluoride co-trifluoroethylene, or may be a rigid substrate, such as glass. The electrochromic device may be flexible and/or stretchable. The substrate may comprise at least one of an air gap and a thermal insulator between at least two layers of the substrate. The active layer may comprise at least one dye molecule. The device may comprise only one substrate, where a surface of the device comprises graphene; or the device may comprise two substrates. At least one substrate of the two substrates may comprise a second active layer, a photovoltaic cell and/or a light-emitting diode.

In further, related versions, the electrochromic device may comprise at least a portion of: a window, a sunroof, an electronic paper display, an electronic reader, an adjustable light diffuser, a privacy screen, a curtain, a textile, a wearable item of apparel or a projection screen. The device may comprise at least a portion of a photovoltaic device or an organic light-emitting display.

In another version of the invention, there is provided a method of manufacturing an electrochromic device. The method comprises: forming at least one layer comprising graphene; forming at least one layer comprising a ferroelectric material to be coupled to the at least one layer comprising graphene, thereby forming at least one electrode of the electrochromic device; and forming at least one layer comprising an active material configured such that the at least one electrode can generate an electric field across the at least one layer comprising the active material.

In further, related versions, forming the at least one layer comprising graphene may comprise a process from the group consisting of: chemical vapor deposition (CVD), micromechanical exfoliation, liquid-phase epitaxy, printing, reduction of graphene oxide, unzipping of carbon nanotubes and epitaxial growth. Forming the at least one layer comprising graphene may comprise growing graphene directly on a substrate, or growing graphene on a substrate and subsequently transferring the graphene off the substrate. Forming the at least one layer comprising a ferroelectric material may comprise growing a polymeric ferroelectric material on the graphene, the growing the polymeric ferroelectric material comprising a process from the group consisting of: spin-coating, dip-coating, wire wound bar coating, blade coating, drop casting, Langmuir-Blodgett film growth, and extrusion from melt. Forming the at least one layer comprising an active material may comprise dispersing a suspended polymer material within a fluid layer, thereby forming a suspended polymer fluid, and depositing the suspended polymer fluid on the at least one electrode. Depositing the suspended polymer fluid may comprise a process from the group consisting of: drop casting, spray coating, spin coating, capillary filling, wire wound bar coating, dip-coating and blade coating. Forming the at least one layer comprising an active material may comprise growing a polymer dispersed liquid crystal structure by at least one of: drop casting, spin coating, spray coating, printing, capillary filling, wire wound bar coating, dip-coating and blade coating. Forming the at least one layer comprising an active material may comprise growing a layered liquid crystal structure by at least one of: drop casting, spin coating, spray coating, capillary filling, wire wound bar coating, dip-coating and blade coating. The method may further comprise infiltrating the at least one layer comprising an active material with dye molecules.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In accordance with a version of the invention, graphene and ferroelectrics are incorporated within the field of electrochromic technologies for films with tunable transparency levels. Processes required for manufacturing said films are provided. Ferroelectricity introduces a degree of non-volatile control to films with regards to their transparency and ergo power consumption. Films may be used for a variety of applications including but not limited to smart windows, heat reduction windows, electrochromic privacy screens, electrochromic curtains, adjustable light diffusers for domestic and commercial lighting, adjustable light diffusers for camera flashes, wearable electrochromic apparel, projection screens, solar cells, organic light-emitting displays (OLEDs), electronic readers, as well as flexible variants of aforementioned versions. Films may be tinted using dichroic or pleochroic dyes for coloration.

In accordance with a version of the invention, graphene plus ferroelectric polymers are used as a replacement for Indium Tin Oxide (ITO) as the transparent electrode material in an electrochromic device. Graphene's flexibility no longer limits the substrate to glass, and the use of curved and dynamically flexing substrates enable flexible and stretchable applications for electrochromic films. Furthermore, the nonreactive and impermeable nature of graphene increases the durability of the device through increased resistance to external impurities.

In accordance with a version of the invention, the incorporation of ferroelectric materials allows the device to exhibit nonvolatile usage; that is, devices can remain transparent with no external power source. Furthermore, devices may exhibit a charging effect, allowing energy dissipated within the device during the initial 'ON' state to be recovered once the device is turned 'OFF'. These features allow the electrochromic device to be more energy efficient when compared to existing commercially available devices. Ferroelectric polymers are also known to reduce the sheet resistance of graphene, further improving the power consumption of these devices. When fluoropolymer ferroelectrics are utilized the superhydrophobic property of the composite imparts a self-cleaning functionality to the device.

The terms "electrochromic device" and "electrochromic panel," as they are used herein include, but are not limited to, the following device or panel structures: suspended particle devices (SPD), polymer dispersed liquid crystal (PDLC) or layered liquid crystal (LLC) structures. Such devices switch between opaque and transparent states via the application of an electric field between two transparent electrical conductors. The active layer sandwiched between the conductors is responsible for the optical switching observed.

Figure 1:
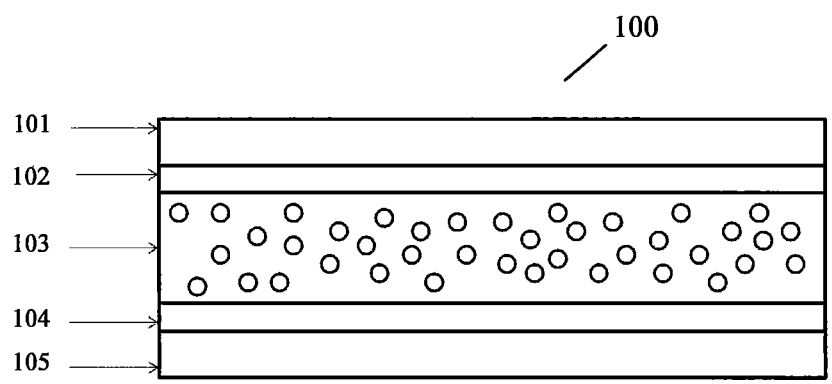
FIG. 1 is a schematic diagram of the structure of an electrochromic device, in accordance with the prior art.

FIG. 1 is a schematic diagram of the structure of an electrochromic device 100, in accordance with the prior art. The device 100 includes a substrate 101, a transparent conductor 102, an active layer 103, a second transparent conductor 104 and a second substrate 105. The two transparent conductors 102 and 104 act as electrodes. Commercially available electrochromic devices currently utilize Indium Tin Oxide (ITO) as the transparent conductors 102 and 104. These devices require between 2 and 10 Watts of uninterrupted power per square meter of panel area in order to maintain a transparent state. Power is typically dissipated while the device is in operation and cannot be recovered when the device is turned off. Furthermore, the devices are inflexible, limiting the range of structures on which they can be applied. In contrast, a version in accordance with the present invention aims to rectify the shortcomings of existing electrochromic devices mentioned above by making use of Graphene-Ferroelectric composite electrodes as a replacement for Indium Tin Oxide (ITO) electrodes.

In accordance with a version of the invention, ferroelectric materials are capable of lowering the sheet resistance of graphene, in turn lowering resistive losses and thus power consumption of devices that utilize electrodes with such structures. Electrodes fashioned out of graphene-ferroelectric composite materials can also be flexible without deteriorating electrical performance. In such cases the inclusion of ferroelectric materials may protect the graphene from structural damage during flexing. The ferroelectric also increases the longevity of the device by protecting it from failures due to short circuits through the active layer. Most importantly, upon application of an external field the ferroelectric layer may polarize, and the resultant realignment of dipoles within the ferroelectric layer will generate a nonvolatile electric field across the active layer. It is expected that this nonvolatile field may enable devices that are able to operate, i.e., remain transparent, without the need for a continuous power supply, thereby further lowering power consumption. Additionally, the remnant energy stored due to the alignment of the dipoles may be recoverable when switching the device back to its opaque state.

Figure 2:
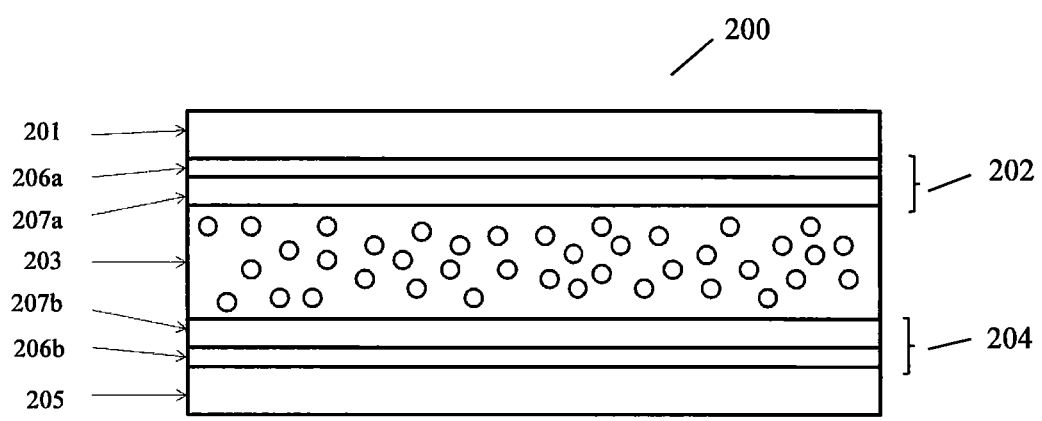
FIG. 2 is a schematic diagram of an electrochromic device utilizing two graphene-ferroelectric electrodes, in accordance with a version of the invention.

FIG. 2 is a schematic diagram of an electrochromic device 200, such as an electrochromic panel, which utilizes two graphene-ferroelectric electrodes, in accordance with a version of the invention. The device 200 includes a substrate 201, a first electrode 202, an active layer 203, a second electrode 204 and a second substrate 205. Each of the electrodes 202 and 204 includes two layers: a graphene layer 206a/206b, and a ferroelectric layer 207a/207b.

Figure 3:
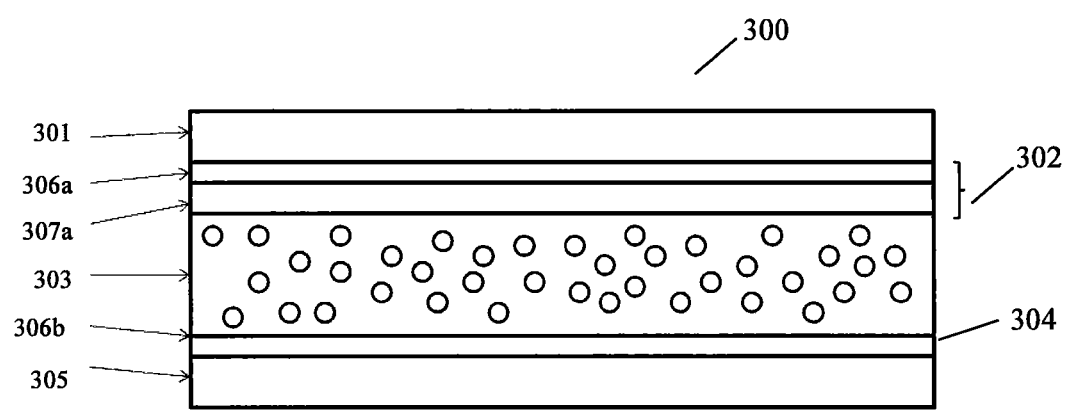
FIG. 3 is a schematic diagram of an electrochromic device utilizing one graphene-ferroelectric electrode and one graphene electrode, in accordance with a version of the invention.

FIG. 3 is a schematic diagram of an electrochromic device 300 utilizing one graphene-ferroelectric electrode and one graphene-only electrode, in accordance with a version of the invention. In this version, the device 300 includes a substrate 301, a first electrode 302, an active layer 303, a second electrode 304 and a second substrate 305. Whereas, the first electrode 302 includes two layers, i.e., a graphene layer 306a and a ferroelectric layer 307a, the second electrode is a graphene-only layer 306b.

Figure 4:
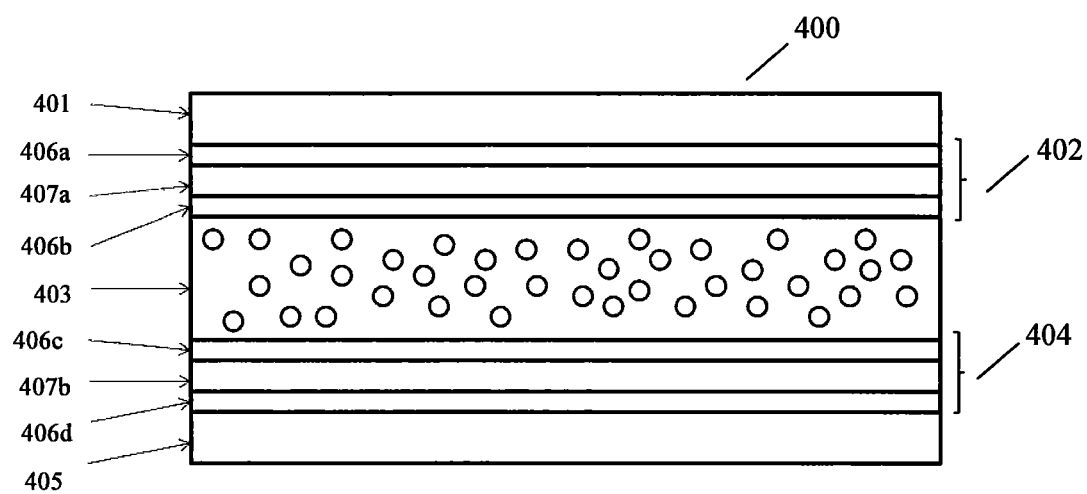
FIG. 4 is a schematic diagram of an electrochromic device utilizing graphene-ferroelectric sandwiched electrodes, in accordance with a version of the invention.

FIG. 4 is a schematic diagram of an electrochromic device utilizing graphene-ferroelectric sandwiched electrodes, in accordance with a version of the invention. Such a structure allows greater control over the polarization of the ferroelectric layers. The device 400 includes a substrate 401, a first electrode 402, an active layer 403, a second electrode 404 and a second substrate 405. Each of the electrodes 402 and 404 includes three layers: two graphene layers 406a/406b are positioned on either side of a ferroelectric layer 407a, and in the other electrode, two graphene layers 406c/406d are positioned on either side of a ferroelectric layer 407b.

Figure 5:
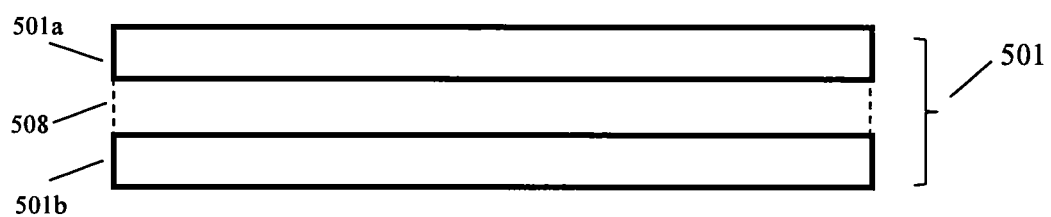
FIG. 5 is a schematic diagram of a substrate of an electrochromic device, incorporating an air gap or thermal insulator, in accordance with a version of the invention.

FIG. 5 is a schematic diagram of a substrate 501 of an electrochromic device, incorporating an air gap or thermal insulator, in accordance with a version of the invention. In this version, it can be seen that the substrate 501 (shown here in isolation from the rest of the electrochromic device, such as that of FIGS. 2-4), may feature an air gap or thermal insulator in area 508, which is interposed between two substrate layers 501a/501b. Such an air gap or thermal insulator 508 may assist with thermal stability of the device.

Below there are provided three separate sections, each relating to either one of a) manufacturing processes and description of materials used in the graphene-ferroelectric electrodes, b) manufacturing processes and description of materials used in the active layer or c) methods for assembling the device and preferred modes of operation, in accordance with a version of the invention.

a) Manufacturing Processes and Description of Materials Used in Graphene-Ferroelectric Electrodes In accordance with a version of the invention, benefits in device performance and efficiency arise from the specific usage and construction of the graphene-ferroelectric electrodes. As used herein, the use of the term "graphene" can refer to mono-layer, bi-layer or multilayer graphene, as well as to interconnected graphene-based mesh networks such as graphene foam. The production process for such graphene can include but are not limited to: chemical vapor deposition (CVD), micromechanical exfoliation, liquid-phase epitaxy, printing, reduction of graphene oxide, unzipping of carbon nanotubes, epitaxial growth on silicon carbide and others. In some cases, graphene composites can be used.

In accordance with a version of the invention, in the context of growth-based processes, graphene may be directly grown on the substrate or can be transferred from the substrate that the graphene is originally grown on. The substrate may be either flexible in nature, such as the polymer polyethylene terephthalate (PET) or the ferroelectric polyvinylidene fluoride co-trifluoroethylene (PVDF-TrFE), or rigid, such as glass. The second substrate may also be another active layer or device such as a photovoltaic cell or an organic light-emitting diode. In some cases there may not be a second substrate and the graphene surface of the device may be exposed. If additional thermal isolation is desired, each substrate may consist of two sheets of either a flexible or rigid material with an air gap or thermal insulator in between (as shown in FIG. 5, above).

In accordance with a version of the invention, the ferroelectric layer may utilize polymer materials including but not limited to fluoropolymers and co-fluoropolymers such as polyvinylidene fluoride (PVDF) and polyvinylidene fluoride co-trifluoroethylene (PVDF-TrFE), or inorganic compounds such as lead zirconate titanate (PZT). In a version pertaining to the use of polymeric ferroelectrics, the layers may be grown on the graphene substrates either before or after the transfer process, using processes including but not limited to: spin-coating, dip-coating, wire wound bar coating, blade coating, drop casting, Langmuir-Blodgett (LB) film growth or extrusion from melt. The composite structure described herein is also referred to herein as a graphene ferroelectric electrode.

b) Manufacturing Processes and Description of Materials Used in the Active Layer In accordance with a version of the invention, the active layer may consist of varying structures depending on the nature of technology utilized for the electrochromic film—namely, suspended particle devices (SPDs), polymer dispersed liquid crystals (PDLCs) or layered liquid crystal (LLC) structures.

In the case of SPDs, in accordance with a version of the invention, the active layer consists of a suspending polymer material in either an organic or inorganic fluid. The suspending polymer material may be polarizing at a molecular level and consist of particles such as herapathite, (dihydrocinchonidine bisulfite polyiodide) or others. The suspending fluid may comprise of an organic liquid or gel such as an oligomeric ester of methacrylic acid. Suspended polymer material can be dispersed within the fluid layer by a mixing process and deposited on electrodes by drop casting, spray coating, spin coating, capillary filling, wire wound bar coating, dip-coating, blade coating, or others.

In the case of the device consisting of a PDLC structure, in accordance with a version of the invention, the active layer consists of liquid crystal materials, such as 4-Cyano-4'-pentylbiphenyl (5CB), in a polymeric matrix, such as poly(methyl methacrylate), poly(vinyl alcohol), poly(vinyl butyral) or others. Materials can be dissolved in a common solvent and later separated using either one of polymerization induced phase separation (PIPS), thermally induced phase separation (TIPS), solvent induced phase separation (SIPS), or others. The active layer can be assembled either directly on the electrode or on a different substrate and later transferred. Growth processes include but are not limited to: drop casting, spin coating, spray coating, printing, capillary filling, wire wound bar coating, dip-coating, blade coating, or others. Where active layers are grown directly on the surface of the graphene-ferroelectric electrode and an organic ferroelectric is used, the film may be more uniform due to improved surface attraction/wetting. Instead of comprising of separate ferroelectric and active layers in a polymer dispersed liquid crystal (PDLC) structure, the material used for encapsulating the liquid crystal can itself be ferroelectric. Thus, it will be appreciated that, as used herein, a ferroelectric material may comprise at least a portion of an active layer, while the active layer may include the ferroelectric material; that is, the ferroelectric material of the electrode need not be in an entirely separate layer from the active layer.

In the case of LLC devices, in accordance with a version of the invention, the active layer consists of solely liquid crystal materials such as 4-Cyano-4'-pentylbiphenyl (5CB) encapsulated between two graphene-ferroelectric electrodes. The active layer can be sealed using a sealant such as acryl, or others, to prevent leakage. Examples of deposition process that may be used include but are not limited to: drop casting, spin coating, spray coating, capillary filling, wire wound bar coating, dip-coating, blade coating, or others.

In accordance with a version of the invention, the active layer may also be infiltrated with dichroic or pleochroic dye molecules that may or may not be of azo or anthraquinone type, which allow the device to be colored in its opaque state. In such instances, the device switches between a colored and a transparent condition in its OFF and ON state respectively.

c) Methods for Assembling the Device and Preferred Modes of Operation

In accordance with a version of the invention, assembly of the final device consists of joining/interfacing the products discussed in parts a) and b) above. More specifically, the active layers described in part b) can be either directly grown on the fenoelectric surface of one or both graphene-ferroelectric electrode structures described in a) using methods described in part b) and then these electrodes assembled, or can be grown separately using methods described in part b) and later assembled to the ferroelectric surface of the graphene-ferroelectric electrodes. Methods for the assembly include but are not limited to: direct contacting, heat based lamination, lamination with the assistance of an optically clear adhesive, or others.

Regarding the operation of devices, in accordance with a version of the invention, electrical contacts can be connected to either an alternating current (AC) or direct current (DC) source. On application of an electric field, the (initially) randomly oriented molecules within the active layer align with the field, allowing light to pass through without scattering. Visually, this is apparent as a switching between opaque and transparent states.

Without wishing to be bound by theory, it is expected that under the application of a direct current source, the scattered dipoles of the ferroelectric layer shall align with the electric field, resulting in a nonvolatile electric field throughout the active layer. This is analogous to the operation of a parallel plate capacitor. Once the external source has been removed, the nonvolatile field within the ferroelectric may remain, the magnitude of which can be estimated as below.

Prior to estimating the magnitude of the nonvolatile field, the voltage drop across the ferroelectric layer or layers needs to be calculated, in order to confirm whether the ferroelectric can be polarized. In order to do so, the system can be modeled as dielectrics in series, with the relative parameters being the dielectric constants and thicknesses of both the active and ferroelectric layers. For one version of the invention, in which the ferroelectric layer comprises of PVDF-TrFE (relative dielectric constant of 10.12) and the active layer consists of a PMMA matrix with liquid crystals (relative dielectric constant measured to be 13.5), the voltage dropped across the ferroelectric for a 200V external bias is calculated as:

$$V=V_0/[1+(\varepsilon_F{}^*t_{AL})/(\varepsilon_{AL}{}^*t_F)]=80.23V$$

where $\varepsilon_F$ and $\varepsilon_{AL}$ are the relative dielectric constants of the ferroelectric and active layers respectively, $t_F$ and $t_{AL}$ are the relative thicknesses of the ferroelectric and active layers respectively, and $V_0$ is the 200V applied DC voltage. The thicknesses of the ferroelectric and active layers have been assumed to be 800 nm and 1.6 μm respectively. Using this thickness, the voltage across the ferroelectric thus corresponds to an electric field of 100.29V/μm, which is higher than the 100V/μm required to polarize it.

In accordance with a version of the invention, it has been found that the typical charge carrier density that can be introduced to the surface of the graphene due to ferroelectric doping, assuming that the ferroelectric material is PVDF-TrFE and that the ferroelectric has been completely polarized, is $n=4\times10^{13}/cm^2$. Treating the system as a parallel plate capacitor, the nonvolatile field due to these charge carriers can be obtained using:

$$E=Q/\varepsilon A=nq/\varepsilon$$

where E is the electric field that remains when the power is switched off, n is the charge carrier density on each plate, q is the electron charge and ε is the dielectric constant of the active layer. For one version of the invention, in which the active layer comprises of a PMMA matrix embedded with liquid crystals, the dielectric constant has been measured to be $1.2\times10^{-10}$ F./m. Using this, the field across the active layer can be calculated to be 53V/μm.

As typical electrochromic panels require greater than 2V/μm in order to switch ON, it is expected that the nonvolatile field shall allow the particles within the active layer to remain in an aligned (i.e. transparent) state without an external power supply. An illustration of the process is provided in FIGS. 6, 7 and 8.

Figure 6:
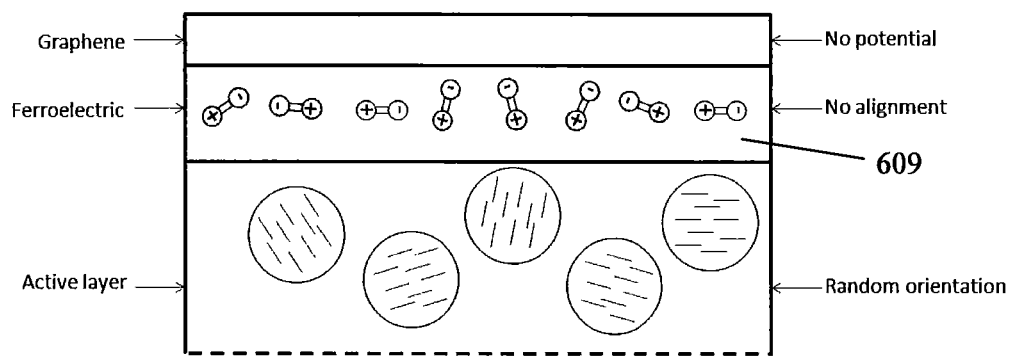
FIG. 6 is a schematic diagram of operation of an electrochromic device in accordance with a version of the invention, in the OFF mode, with no orientation of the ferroelectric dipoles.

FIG. 6 is a schematic diagram of operation of an electrochromic device in accordance with a version of the invention, in the OFF mode, with no orientation of the ferroelectric dipoles 609.

Figure 7:
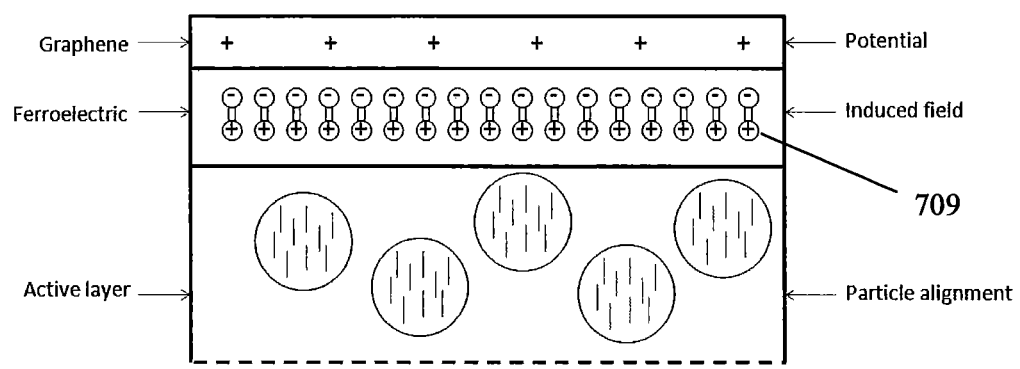
FIG. 7 is a schematic diagram of operation of an electrochromic device in accordance with a version of the invention, in the ON mode, with ferroelectric dipoles aligned with the external field.

FIG. 7 is a schematic diagram of operation of an electrochromic device in accordance with a version of the invention, in the ON mode, with ferroelectric dipoles 709 aligned with the external field.

Figure 8:
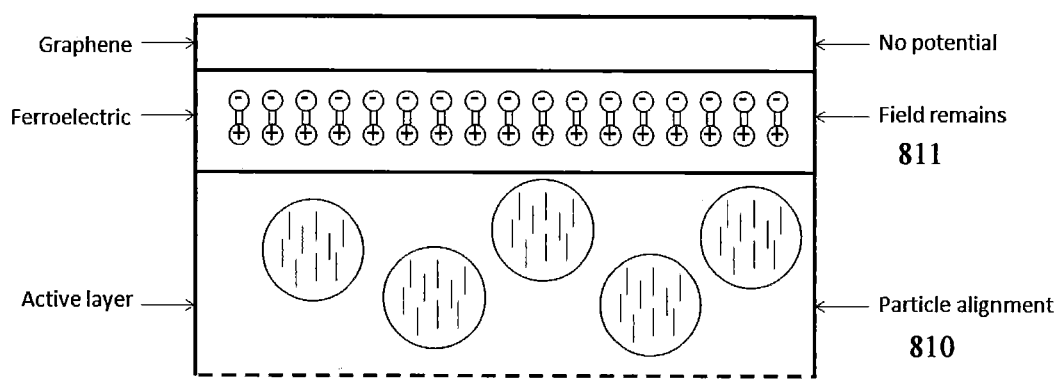
FIG. 8 is a schematic diagram of operation of an electrochromic device in accordance with a version of the invention, once the external field is removed, with particle alignment maintained due to remnant field within the ferroelectric layer.

FIG. 8 is a schematic diagram of operation of an electrochromic device in accordance with a version of the invention, once the external field is removed, with particle alignment 810 maintained due to remnant field 811 within the ferroelectric layer.

In accordance with a version of the invention, the opaque state of the device may be re-obtained by forcing the dipoles within the ferroelectric to return to their original scattered alignment. The energy stored in the alignment of the ferroelectric dipoles may be recovered and used to power other devices or stored and used in subsequent operations of the same device.

Figure 9A:
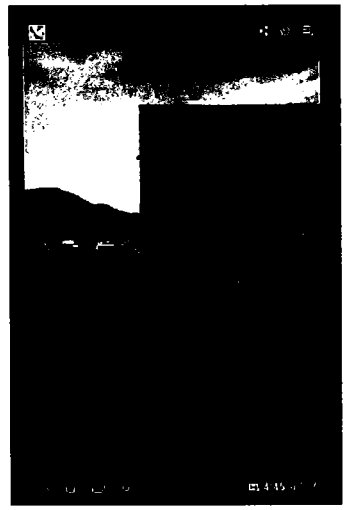
FIGS. 9A and 9B are photographs showing the operation (OFF in FIG. 9A, ON in FIG. 9B) of a device utilizing graphene-ferroelectric electrodes, in accordance with a version of the invention.
Figure 9B:
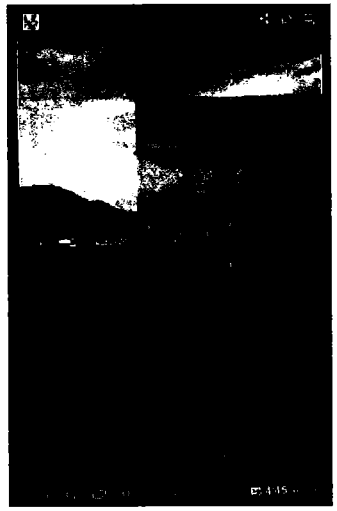

FIGS. 9A and 9B are photographs showing the operation (OFF in FIG. 9A, ON in FIG. 9B) of a prototype device utilizing graphene-ferroelectric electrodes, in accordance with a version of the invention. The device is a PDLC structure with two graphene-ferroelectric electrodes. The size of the device is approximately 5 cm by 5 cm.

The expected benefits of graphene-ferroelectric electrochromic devices in accordance with a version of the invention, as compared with commercially available devices, include the following:

Battery effect: Commercial devices require continuous power in order to remain transparent. In contrast, the ability of the ferroelectric layer to be polarized, permits graphene-ferroelectric electrochromic devices to operate without external power, once the ferroelectric layer has been charged. The charging/discharging of the ferroelectric may also allow the device to store and recover the energy used to switch between the transparent and opaque states.

Lower power consumption: The theoretical limit for the sheet resistance of graphene doped with ferroelectric materials is less than its ITO counterpart, hence power lost due to resistive losses at the electrodes should be less with graphene-ferroelectric devices. This will result in an increase in energy efficiency as compared to standard devices.

Self-cleaning: In the instance where the graphene-ferroelectric electrode is exposed to air, the superhydrophobic nature of these materials enables devices to be highly repellant to dust and other sources of contamination.

Flexibility: Commercially available devices typically make use of Indium Tin Oxide (ITO) as the electrode. The replacement of ITO with graphene-ferroelectric electrodes allows devices to be flexible.

Increased device lifetime: The ferroelectric layer may increase the life of the device by protecting it from short circuits between the two conducting graphene sheets as the active layer degrades over time.

Thermal stability: As a result of graphene's high thermal conductivity, the graphene-ferroelectric electrodes based devices will dissipate localized point thermal sources better than their ITO counterparts and will protect the device from degradation making device operation more reliable.

Industrial applications of an electrochromic device in accordance with a version of the invention include, but are not limited to:

As-built or retrofitted electrochromic panels for windows in residential/commercial buildings As-built or retrofitted electrochromic panels for windshields, windows and sunroofs for automobiles Flexible black-and-white or color displays for use as electronic paper either standalone or in electronic readers Adjustable diffusers for residential and commercial lighting installations Adjustable diffusers for camera flashes Heat reduction windows Privacy screens Flexible electrochromic textiles for curtains, lampshades, furniture and coverings etc.

Wearable electrochromic apparel

Projection screens

Integrated with photovoltaic devices

Organic light-emitting displays (OLEDs)

Table 1 is a comparison of a prior art panel with an electrochromic panel in accordance with a version of the invention.

TABLE 1

| Metric | Prior Art Commercial Electrochromic Panel | Prototype Flexible Privacy Glass, Ferroelectric Model |
| --- | --- | --- |
| Power Consumption (mW/sqm) | 6000 | 3.5 |
| Transparency ON state (%) | 75 | >75 |
| Transparency OFF state (%) | 7 | 0.5 |
| UV Transmission (at 250 nm) | 1% | 0.1% |
| Controlled dimming | No | Tunable Opacity |
| Non-volatile operation | No | Yes |
| Flexibility | Twice as flexible as glass | Completely flexible |

It can be seen in Table 1 that a version of the invention has a lower power consumption (on the order of 0.5% of control); a higher contrast ratio; and is on the order of 100 times more flexible than glass. Initial non-volatile operation testing shows a delay of 2-3 seconds in return to 'OFF' state for the graphene-ferroelectric electrode. Tunable opacity has been demonstrated.

Figure 10:
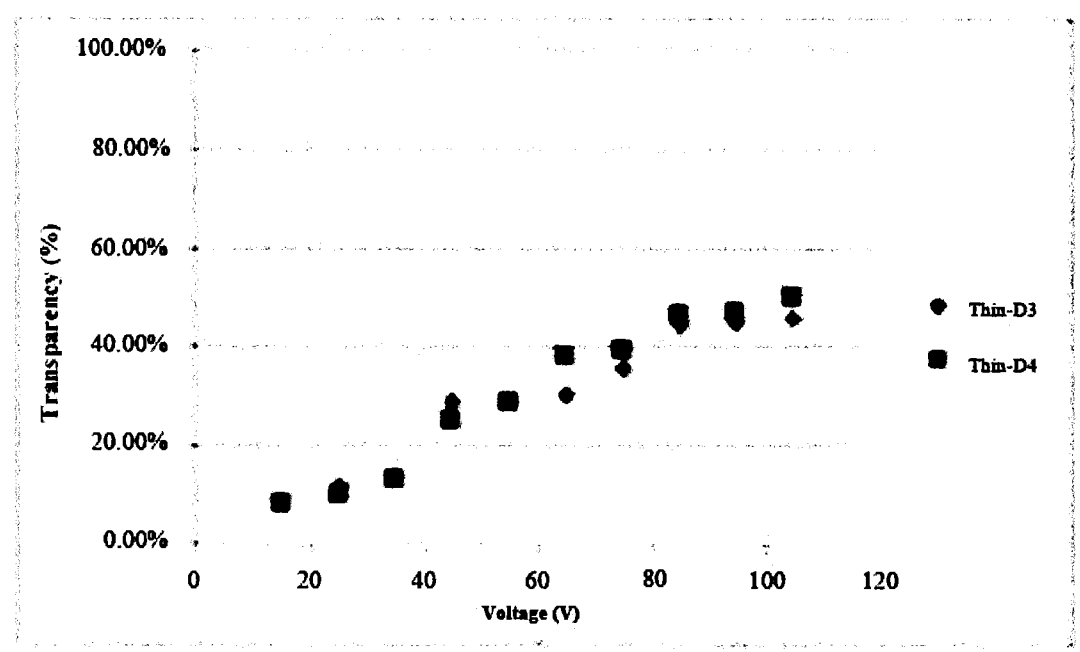
FIG. 10 is a graph of transparency as a function of applied voltage in electrochromic devices in an experiment, in accordance with a version of the invention.

FIG. 10 is a graph of transparency as a function of applied voltage in electrochromic devices in an experiment, in accordance with a version of the invention. In the experiment, a UV-Vis spectrometer was set to 550 nm (green light). It can be seen that transparency varies with applied voltage. The demonstration was performed on a thinner active layer on a low quality substrate, and thus had unoptimized transparency levels.

While this invention has been particularly shown and described with references to example embodiments thereof, it will be understood by those skilled in the art that various changes in form and details may be made therein without departing from the scope of the invention encompassed by the appended claims.

What is claimed is:

1. An electrochromic device, the device comprising:
   at least one electrode including graphene and at least one ferroelectric material; and
   an electrochromic active layer, the electrochromic active layer configured to vary between an opaque and transparent state via the application of an electric field between two electrodes comprising the at least one electrode that includes graphene and at least one ferroelectric material;
   the at least one ferroelectric material of the at least one electrode being configured to apply a nonvolatile electric field across the electrochromic active layer such that the electrochromic device is configured to remain transparent with no external power source.

2. The electrochromic device of claim 1, wherein the at least one electrode comprises two electrodes, each of the two electrodes including graphene and at least one ferroelectric material.

3. The electrochromic device of claim 1, wherein the at least one electrode comprises at least one ferroelectric material layer located between a first layer of graphene and a second layer of graphene.

4. The electrochromic device of claim 1, wherein the at least one electrode comprises two electrodes, a first electrode of the two electrodes including graphene and at least one ferroelectric material, and a second electrode of the two electrodes comprising only graphene.

5. The electrochromic device of claim 1, wherein the electrochromic active layer comprises a liquid crystal material.

6. The electrochromic device of claim 5, wherein the electrochromic active layer comprises the liquid crystal material dispersed in a polymer.

7. The electrochromic device of claim 1, wherein the electrochromic active layer comprises a suspending polymer material.

8. The electrochromic device of claim 1, wherein the ferroelectric material comprises a ferroelectric polymer.

9. The electrochromic device of claim 8, wherein the ferroelectric material comprises at least one of a fluoropolymer ferroelectric material and a co-fluoropolymer ferroelectric material.

10. The electrochromic device of claim 1, wherein the ferroelectric material comprises lead zirconate titanate.

11. The electrochromic device of claim 1, wherein the electrochromic device is configured to permit recovery of energy stored in alignment of ferroelectric dipoles within the ferroelectric material.

12. The electrochromic device of claim 1, wherein the graphene of the at least one electrode comprises a material selected from the group consisting of: monolayer graphene; bi-layer graphene; multilayer graphene; an interconnected graphene-based mesh network; and a graphene composite.

13. The electrochromic device of claim 1, further comprising a substrate.

14. The electrochromic device of claim 13, wherein the substrate comprises a flexible substrate.

15. The electrochromic device of claim 1, wherein the device is flexible.

16. The electrochromic device of claim 13, wherein the substrate comprises at least one of an air gap and a thermal insulator between at least two layers of the substrate.

17. The electrochromic device of claim 1, wherein the electrochromic active layer comprises at least one dye molecule.

18. The electrochromic device of claim 13, wherein the device comprises only one substrate, and wherein a surface of the device comprises graphene.

19. The electrochromic device of claim 13, wherein the device comprises two substrates.

* * * * *